United States Patent
Martini et al.

(10) Patent No.: US 11,669,564 B2
(45) Date of Patent: Jun. 6, 2023

(54) SYSTEM AND METHOD FOR AGGREGATING, TAGGING AND DISTRIBUTING UNSTRUCTURED DATA AS STRUCTURED DATA IN REAL TIME

(71) Applicant: Pixel Titan LLC, San Francisco, CA (US)

(72) Inventors: Jonathan Martini, Mount Juliet, TN (US); Steven Solidarios, Mountain View, CA (US); Jonathan Eugenio, El Sobrante, CA (US)

(73) Assignee: PIXEL TITAN LLC, San Francisco, CA (US)

(*) Notice: Subject to any disclaimer, the term of this patent is extended or adjusted under 35 U.S.C. 154(b) by 0 days.

(21) Appl. No.: 17/957,796

(22) Filed: Sep. 30, 2022

(65) Prior Publication Data

US 2023/0083777 A1  Mar. 16, 2023

Related U.S. Application Data

(63) Continuation of application No. 16/922,279, filed on Jul. 7, 2020, now Pat. No. 11,481,430.

(60) Provisional application No. 62/871,562, filed on Jul. 8, 2019.

(51) Int. Cl.
| | |
|---|---|
| *G06F 16/51* | (2019.01) |
| *G06F 9/54* | (2006.01) |
| *H04N 1/21* | (2006.01) |
| *H04N 23/60* | (2023.01) |

(52) U.S. Cl.
CPC .............. *G06F 16/51* (2019.01); *G06F 9/54* (2013.01); *H04N 1/2166* (2013.01); *H04N 23/60* (2023.01)

(58) Field of Classification Search
CPC ........................................ G06F 16/51
USPC ........................................ 348/231.1
See application file for complete search history.

(56) References Cited

U.S. PATENT DOCUMENTS

2020/0374273 A1* 11/2020 Jones ...................... G06F 9/547

* cited by examiner

*Primary Examiner* — Joel W Fosselman
(74) *Attorney, Agent, or Firm* — Orrick, Herrington & Sutcliffe LLP

(57) ABSTRACT

A data processing system for aggregating, tagging and distributing unstructured data as structured data in real time and methods for manufacturing and using same. A camera for capturing photographic images is deployed at a selected event and, upon capturing an image of one or more event attendees, associates the image with native metadata. The native metadata includes attendee contact information for enabling the camera to send the image to the attendee in real time. The camera likewise sends the image and native metadata to a content processing system, which separates the raw image data from the native metadata and utilizes the native metadata to identify additional derived metadata for the image. By aggregating images from multiple events and tagging the images with the native and derived metadata, the data processing system advantageously can store the unstructured images in content wrappers as structured data for facilitating later distribution.

1 Claim, 19 Drawing Sheets

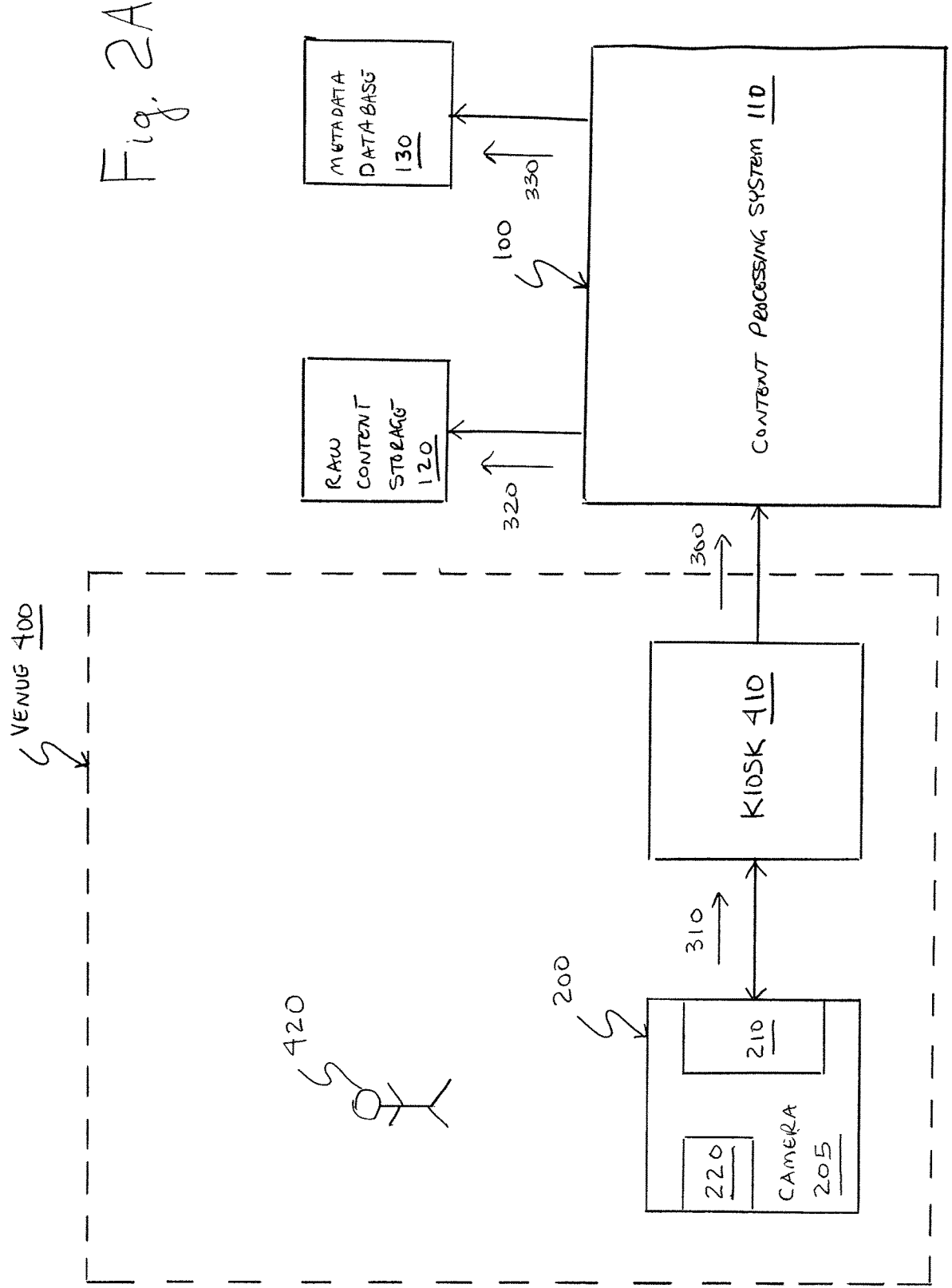

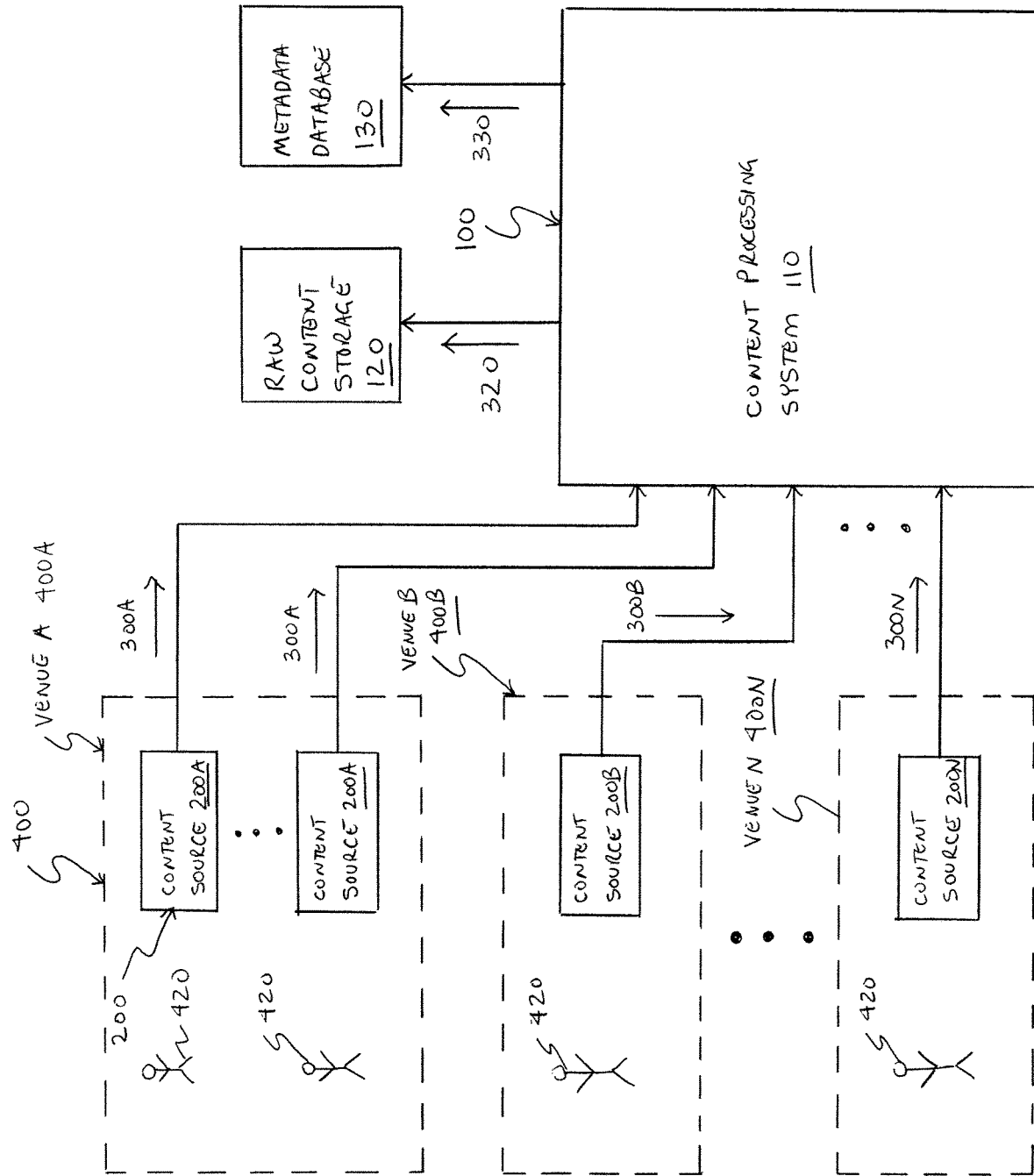

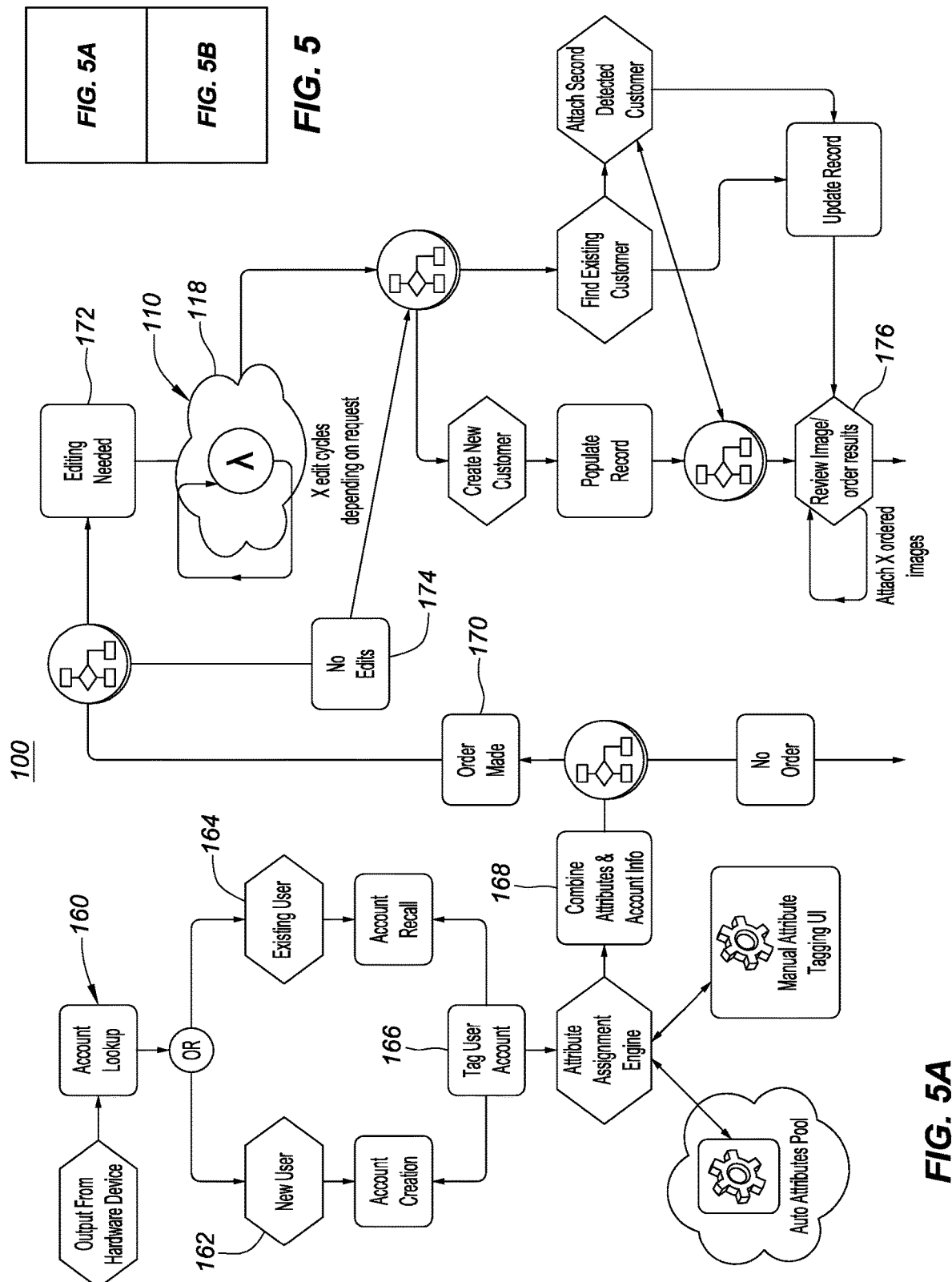

SYSTEM AND METHOD FOR AGGREGATING, TAGGING AND DISTRIBUTING UNSTRUCTURED DATA AS STRUCTURED DATA IN REAL TIME

CROSS-REFERENCE TO RELATED APPLICATIONS

This application is a continuation of co-pending U.S. patent application Ser. No. 16/922,279, filed on Jul. 7, 2020, which claims the benefit of, and priority to, U.S. Provisional Application Ser. No. 62/871,562, filed Jul. 8, 2019, the disclosure of which is hereby incorporated herein by reference in its entirety and for all purposes.

FIELD

The disclosed embodiments relate generally to data processing systems and more particularly, but not exclusively, to data processing systems and methods suitable for aggregating, tagging and distributing unstructured data as structured data in real time.

BACKGROUND

To capture and memorialize their experiences while participating in social events, consumers take countless photographs for sharing with their families and friends. Consumers, however, rarely download and annotate their photographs contemporaneously with the events. The photographs therefore typically end up being stored as unstructured data along with other accumulated data content and without sufficient information to permit subsequent real-time searching or arranging of the photographs and other accumulated data content even with conventional computing systems. This problem only grows worse as the volume of accumulated data content increases over time and also extends to business entities that interpret, monetize and otherwise deal with large sets of unstructured data. Such business entities face growing certainty related to cost, infrastructure and regulation issues related to use of the data sets.

In view of the foregoing, a need exists for an improved data processing system and method for processing unstructured data that overcome the aforementioned obstacles and deficiencies of currently-available computing systems.

BRIEF DESCRIPTION OF THE DRAWINGS

FIG. 2A is an exemplary top-level block diagram illustrating an alternative embodiment of the data processing system of FIG. 1, wherein the data processing system can receive content from a content source associated with a selected venue.

FIG. 2B is an exemplary top-level block diagram illustrating an alternative embodiment of the data processing system of FIG. 2A, wherein the data processing system can receive content from a plurality of content sources distributed across one or more selected venues.

FIGS. 5, 5A and 5B are an exemplary detail drawing illustrating another alternative embodiment of the data processing system of FIG. 3.

FIGS. 9A, 9A-1 and 9A-2 are an exemplary top-level block diagram illustrating a process for generating a content wrapper for the content received by the data processing system of FIG. 3.

Figure 1:
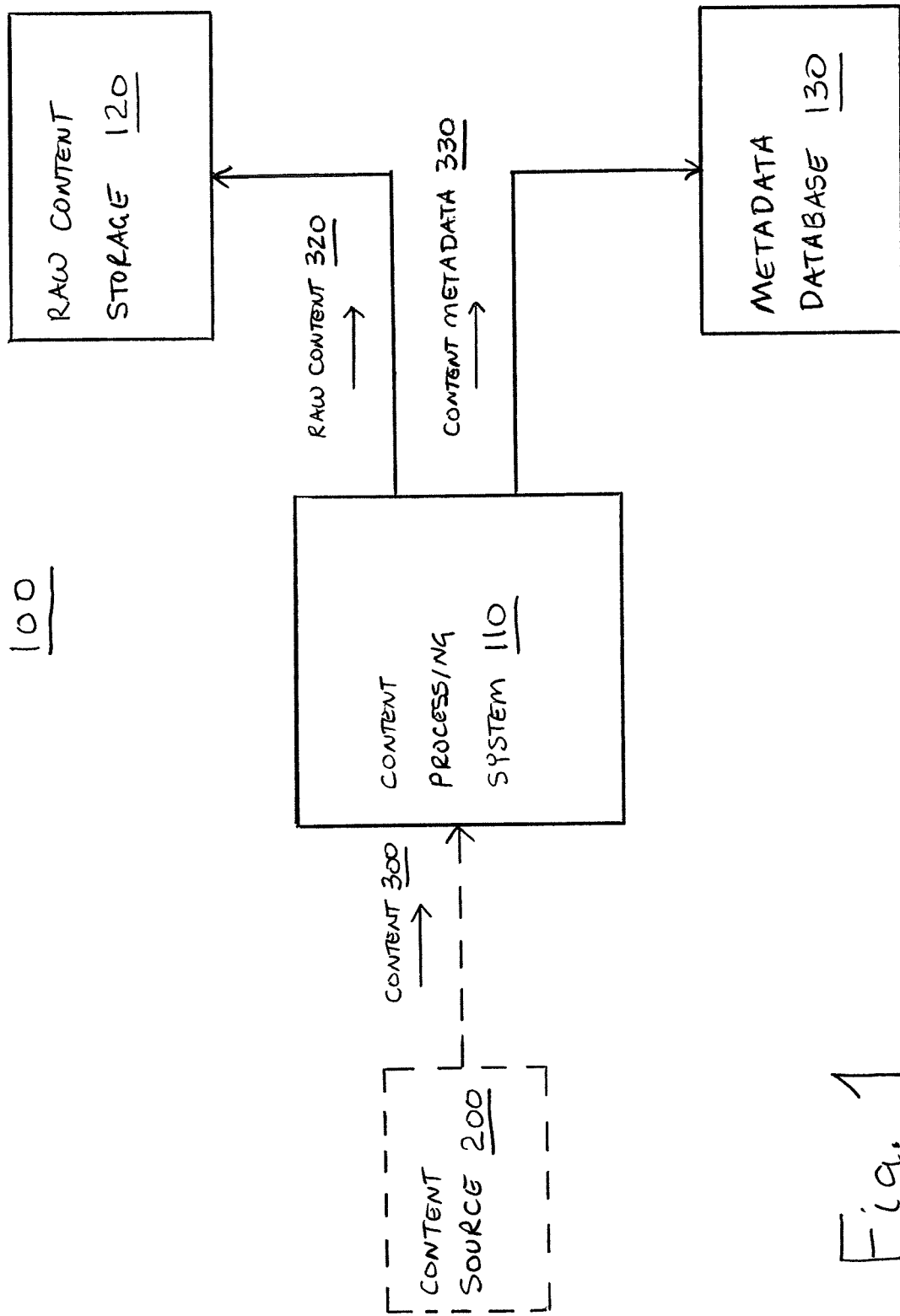
FIG. 1 is an exemplary top-level block diagram illustrating an embodiment of a data processing system for receiving content and processing the received content to provide raw content and content metadata.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available computing systems lack sufficient processing resources to permit real-time searching or arranging of photographs and other types of unstructured data, a data processing system and method suitable for aggregating, tagging and distributing unstructured data as structured data in real time can prove desirable and provide a basis for a wide range of applications, such as distributing photographs generated at sporting events, corporate events, music concerts, amusement parks and other venues and/or events. This result can be achieved, according to one embodiment disclosed herein, by a data processing system 100 as illustrated in FIG. 1.

Turning to FIG. 1, the data processing system 100 is shown as including a content processing system 110 for processing content 300 to provide raw content 320 and content metadata 330. The content processing system 110 can comprise any appropriate number, type and/or configuration of conventional computer-based processing systems, such as one or more microprocessors (μPs), one or more central processing units (CPUs) and/or one or more digital signal processors (DSPs), without limitation, suitable for processing the content 300. Preferably including at least one computer server, the content processing system 110 can be provided as a centralized processing system in some embodiments and/or as a distributed processing system in other embodiments. For example, the content processing system 110 can include a plurality of distributed processing elements, memory (or data storage) elements and/or other network elements that can communicate via a computer network or other type of computing platform, including, but not limited to, a Local Area Network (LAN), a Wide Area Network (WAN), a Wireless Local Area Network (WLAN), a Metropolitan Area Network (MAN), a Campus Area Network (CAN), the Internet and/or the Cloud.

The content 300 can comprise any conventional type of digital content, including digital video content and/or digital audio content, and can be provided in any suitable electronic content format. Exemplary content 300 can include, but is not limited to, one or more photographs, one or more sound recordings, and/or textual materials, such as forms, reference materials, or other documents. The content 300 can include underlying (or raw) content and, in selected embodiments, optional native attributes (or metadata). The native metadata can be automatically generated at the time that the content 300 is created and can provide a description and other information related to the raw content. If the content 300 comprises a photograph, for example, the raw content can be the photographic image; whereas, the native metadata can provide a title, keywords, a creation date, a creation location and/or other information about the photographic image.

Upon receiving the content 300, the data processing system 100 can process the received content 300 to separate the raw content 320 from the native metadata. The data processing system 100 advantageously can utilize the native metadata to associate one or more derived attributes (or metadata) to the received content 300. Stated somewhat differently, the derived metadata can be generated based upon the native metadata and after the received content 300 was created. The derived metadata can include further information, such as context information, associated with the received content 300 and advantageously can be automatically created while the content 300 is being transmitted to the raw content storage 120 and the metadata database 130 for storage.

The data processing system 100, for example, can determine that the received content 300 is associated with a selected event and thus can associate derived metadata, such as an event location, event date and/or event sponsor, for the selected event with the received content 300. In selected embodiments, the data processing system 100 performs operations only on the native metadata and the derived metadata, maintaining the raw content 320 in its original form. By combining the native metadata and the derived metadata to form the composite content metadata 330 for the received content 300, the data processing system 100 can aggregate, tag and distribute the unstructured content 300 for the selected event as structured content 300, preferably in real time.

The data processing system 100 of FIG. 1 is shown as further including raw content storage 120 and a metadata database 130. Being in communication with the content processing system 110, the raw content storage 120 and the metadata database 130 can comprise any conventional type of memory (or data storage) system and preferably include cloud-based memory (or data storage) systems. The raw content storage 120 thereby can receive the raw content 320 from the content processing system 110 and store the raw content 320 for subsequent access. The metadata database 130 can receive the content metadata 330 from the content processing system 110 and store the content metadata 330 for subsequent access.

By associating the stored raw content 320 with the stored content metadata 330, the data processing system 100 advantageously can store the otherwise unstructured content 300 in a content wrapper as structured data for facilitating later access and/or distribution. Use of cloud-based memory data storage systems can further facilitate access to, and distribution of, the stored raw content 320 and/or the stored content metadata 330. In some embodiments, the data processing system 100 can store the raw content 320 separately from the content metadata 330. Although shown and described as comprising separate data storage systems for purposes of illustration only, the raw content storage 120 can be at least partially integrated with the metadata database 130 in some embodiments.

The content 300 can be provided to the content processing system 110 in any suitable manner. As shown in FIG. 1, for example, the content processing system 110 can communicate with an optional content source 200. The content source 200 can be enabled to push or otherwise provide the content 300 to the content processing system 110 via wired communications and/or wireless communications. In selected embodiments, the content source 200 can provide the content 300 to the content processing system 110 in real time, periodically and/or in accordance with any predetermined manner (or criteria). Additionally and/or alternatively, the content processing system 110 can receive the content 300 from the content source 200 in real time, periodically and/or in accordance with any predetermined manner (or criteria). The content processing system 110, for example, can monitor the content source 200 and, upon determining that new content 300 is available at the content source 200, can pull the new content 300 from the content source 200.

Figures 1, 9A:
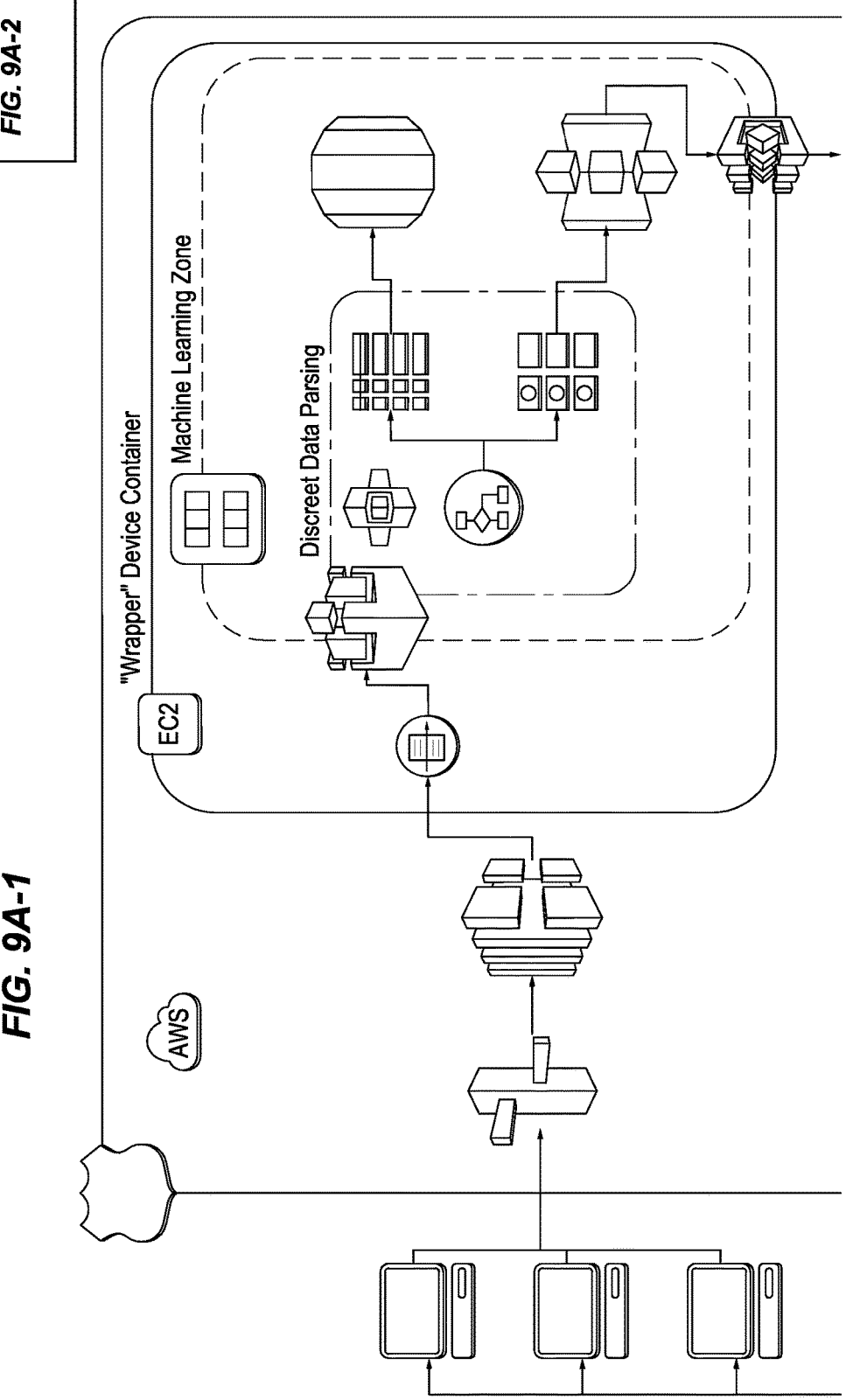
Figures 2, 9A:
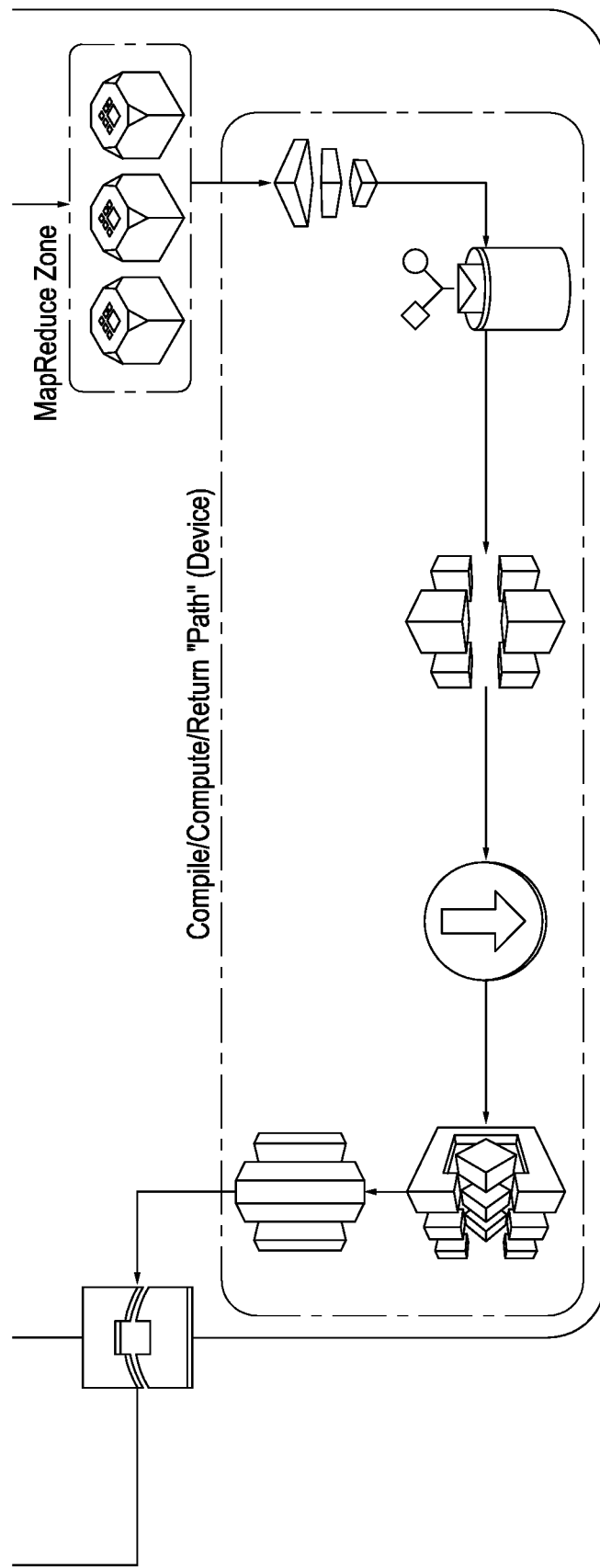

Turning to FIG. 2A, the content source 200 is shown as being associated with a selected venue 400. The selected venue 400 can be the location at which one or more attendees 420 view or otherwise participate in a sporting event, a corporate event, a music concert or any other type of event. As shown in FIG. 2A, the content source 200 can include a camera 205 that can be operated by a photographer (not shown) and that can capture one or more photographic images 310 associated with at least one selected attendee 420 during the event. The selected attendee 420 can provide attendee contact information, such as an attendee name and/or an attendee telephone number, to the photographer and can have one or more photographic images 310 captured for commemorating participation in the event.

The camera 205 can include a user interface 220, such as a touchscreen display system, for permitting the photographer to input the attendee contact information into the camera 205. Each of the photographic images 310 thereby can be annotated with the attendee contact information and any other native metadata generated by the camera 205 at the time that the photographic images 310 are captured. The camera 205 can provide the annotated photographic images 310 with the expanded native metadata to the content processing system 110 as the content 300. In selected embodiments, an appropriate software application can be installed on the kiosk 410 for permitting the attendee contact information to be entered, in whole and/or in part, via the kiosk 410.

The content processing system 110 can transmit or otherwise provide a copy of the captured photographic images 310 to the selected attendee 420 based upon the attendee contact information, preferably in real time. In other words, if the attendee contact information comprises a telephone number, the content processing system 110 can transmit the captured photographic images 310 directly to the mobile telephone of the selected attendee 420 in real time for viewing during the event. Advantageously, if attendee contact information is provided for multiple attendees 420 associated with the captured photographic images 310, the content processing system 110 can distribute a copy of the captured photographic images 310 to each of the associated attendees 420 in real time.

The camera 205 at the selected venue 400 can communicate directly with the content processing system 110 and/or, as shown in FIG. 2A, can indirectly communicate with the content processing system 110 via one or more intermediate systems, such as kiosk 410. The kiosk 410 can comprise a computer system for providing a wireless local area network, such as via a wireless fidelity (or Wi-Fi) communication connection and/or a Bluetooth communication connection, between the camera 205 at the selected venue 400 and the content processing system 110. Preferably comprising a portable computer system, the kiosk 410 can be carried by the photographer while capturing photographic images 310 at the selected venue 400. The photographic images 310 captured by the camera 205 thereby can be conveyed to the content processing system 110 as the content 300 via the kiosk 410.

Additionally and/or alternatively, the camera 205 can include an optional wireless communication interface 210 for facilitating communications with the content processing system 110 and/or the kiosk 410. In selected embodiments, for example, a software application can be downloaded into the wireless communication interface 210 for establishing a wireless communication connection, such as via a wireless fidelity (or Wi-Fi) communication connection and/or a Bluetooth communication connection, with the content processing system 110 and/or the kiosk 410. The wireless communication interface 210 thereby can synchronize with the content processing system 110 and/or the kiosk 410.

The wireless communication connection preferably comprises a stable communication connection for supporting reliable communication between the camera 205 and the content processing system 110 and/or the kiosk 410 for transmission of the captured photographic images 310 in real time. The wireless communication interface 210 can be integrated into the camera 205 and/or coupled with a peripheral device communication port (not shown), such as a Universal Serial Bus (or USB) port, of the camera 205. In preferred embodiments, the wireless communication interface 210 can support automated editing and workflow sets for the captured photographic images 310, being customizable by a user and being triggered update detection of one or more new photographic images 310.

In some embodiments, the wireless communication interface 210 can be provided as a dongle that can be connected to the camera 205. Advantageously, the wireless communication interface 210 can spoof (or mimic) a local memory system of the camera 205 without interfering with normal operation of the camera 205. The photographic images 310 captured by the camera 205 thereby can be stored by the wireless communication interface 210 rather than in the local memory system of the camera 205. Additionally and/or alternatively, the wireless communication interface 210 can enable the photographer to edit one or more of the captured photographic images 310 via the user interface 220 of the camera 205.

The wireless communication interface 210, for example, can comprise a compact processing system, such as a single-board Raspberry Pi computer system, for enabling the photographer to collect and edit the photographic images 310. In selected embodiments, the wireless communication interface 210 can be pre-programmed with predetermined information for grouping the captured photographic images 310. The predetermined grouping information can include a name of the photographer, a name of the selected venue 400, a location of the selected venue 400, a name of the selected event, one or more characteristic of the selected event, a schedule of events, and/or a name of an event sponsor, without limitation. Exemplary event characteristics can include special promotional event information, such as bobblehead day at a sporting event.

The wireless communication interface 210 can include the predetermined grouping information as a part of the expanded native metadata for each photographic image 310 captured by the camera 205 during the event at the selected venue 400. Stated somewhat differently, the predetermined grouping information can be included in the native metadata for the photographic images 310 as stored in the wireless communication interface 210. The expanded native metadata for the photographic images 310 optionally can include any information, such as the attendee name and/or attendee contact information, entered by the photographer via the user interface 220 of the camera 205. By associating the captured photographic images 310 with the expanded native metadata, the wireless communication interface 210 advantageously can store the captured photographic images 310 and expanded native metadata in a content wrapper as structured data for facilitating later access. In one embodiment, the user interface 220 of the camera 205 can present the content wrapper with the expanded native metadata for one or more of the photographic images 310 for viewing and/or editing by the photographer.

Although each photographic image 310 captured during the event at the selected venue 400 can include the same predetermined grouping information, the attendee name and/or attendee contact information can differ among the captured photographic images 310 as photographic images 310 are captured for different attendees 420 (or for different groups of attendees 420). The wireless communication interface 210 advantageously enables the photographer to change the attendee name, attendee contact information and/or other image attributes (or native metadata) for any of the photographic images 310 on the fly. The wireless communication interface 210 thereby preferably preprocesses the captured photographic images 310 and related native metadata prior to transmission to the content processing system 110 and/or the kiosk 410.

In addition to transmitting the captured photographic image 310 and native metadata to the content processing system 110 and/or the kiosk 410, the wireless communication interface 210 advantageously can enable the photographer to deliver the captured photographic images 310 straight from the camera 205 to one or more locations. The locations for sending the captured photographic images 310 can be based upon the attendee contact information of one or more selected attendee 420 and/or can be selected by the photographer at any time before, while or after the photographic images 310 are captured. The wireless communication interface 210 thereby can send a unique set of photographic images 310 to each of the selected attendees 420, preferably in real time.

Advantageously, the data processing system 100 can provide, for example, cloud-based storage for the captured photographic images 310 and associated metadata. In some embodiments, the data processing system 100 can transmit photographic images 310 to the selected attendees 420 while concurrently transmitting the photographic images 310 and associated metadata for storage in a local storage system and/or in the cloud-based storage, such as the raw content storage 120 and/or the metadata database 130. Upon receiving the captured photographic images 310 and expanded native metadata, the content processing system 110 can separate the photographic image from the expanded native metadata for each of the received photographic images 310. The content processing system 110 can provide the raw photographic image data for each of the received photographic images 310 as the raw content 320 for storage in the raw content storage 120. The raw photographic image data preferably is not processed by the content processing system 110.

The content processing system 110 optionally can utilize the expanded native metadata of the captured photographic images 310 to associate one or more derived attributes (or metadata) to the captured photographic images 310. The derived metadata can be stored at the content processing system 110 and can provide additional descriptive and other information related to the raw photographic image data. The content processing system 110 thereby can generate or otherwise apply the derived metadata to the photographic images 310 after the photographic images 310 have been captured.

The derived metadata can be based upon the expanded native metadata of the captured photographic images 310 and can further extend the expanded native metadata. If the expanded native metadata includes date and venue 400 information for the photographic images 310, for example, the derived metadata can include an event type of the selected event, a name of a sponsor of the selected event, a promotion associated with the selected event and/or one or more additional characteristic of the selected event, without limitation. The content processing system 110 can combine the expanded native metadata of the captured photographic images 310 with the derived metadata.

The combined expanded native metadata and the derived metadata can form the content metadata 330 for storage in the metadata database 130. By associating the captured photographic images 310 with the native and derived attributes of the content metadata 330, the data processing system 100 can store the otherwise unstructured captured photographic images 310 in an image (or content) wrapper as structured data for facilitating later access. Although shown and described with reference to FIG. 2A as comprising a camera 205 for capturing photographic images 310 for purposes of illustration only, the content source 200 can comprise any conventional type of content source for providing any type of digital content 300 to the content processing system 110.

The content processing system 110 preferably can communicate with a plurality of content sources 200 as illustrated in FIG. 2B. The content sources 200A-N can be provided in the manner set forth in more detail above with reference to the content source 200 of FIG. 2A and can distributed across one or more selected venues 400A-N. The data processing system 100 thereby can process content 300 generated at any predetermined number of venues 400A-N simultaneously and in real time. As shown in FIG. 2B, one content source 200B can be associated with the selected venue 400B; whereas, multiple content sources 200A can be associated with the selected venue 400A. The number of content sources 200A-N associated with a selected venue 400A-N can depend, for example, on a size of the selected venue 400A-N, a nature of the event being held at the selected venue 400A-N and/or a number of anticipated attendees 420.

In the manner discussed in more detail above with reference to FIG. 2A, the content sources 200A-N at the selected venue 400A-N can include at least one camera 205 (shown in FIG. 2A). The camera 205 can capture one or more photographic images 310 (shown in FIG. 2A) associated with at least one selected attendee 420 present at the selected venue 400A-N during the event. As set forth above, the selected attendee 420 can provide attendee contact information and have one or more photographic images captured 310 for commemorating participation in the event. Once the attendee contact information is input, the camera 205 can provide the entered attendee contact information and other native metadata with the captured photographic images 310 to the content processing system 110 as the content 300A-N. The content processing system 110 can transmit or otherwise provide a copy of the captured photographic images 310 to each of the one or more associated attendees 420 via the attendee contact information, preferably in real time, in the manner discussed herein.

The content sources 200A-N optionally can provide the captured photographic images 310 and expanded native metadata to the content processing system 110. Upon receiving the captured photographic images 310 and expanded native metadata, the content processing system 110 can separate the photographic image from the expanded native metadata for each of the received photographic images 310. The content processing system 110 can provide the raw photographic image data for each of the received photographic images 310 as the raw content 320 for storage in the raw content storage 120. The raw photographic image data preferably is not processed by the content processing system 110.

In the manner discussed above with reference to FIG. 2A, the content processing system 110 can utilize the expanded native metadata of the captured photographic images 310 to associate one or more derived attributes (or metadata) to the captured photographic images 310. The derived metadata can be stored at the content processing system 110 and can provide additional descriptive and other information related to the raw photographic image data. The content processing system 110 thereby can generate or otherwise apply the derived metadata to the photographic images 310 after the photographic images 310 have been captured and can combine the expanded native metadata of the captured photographic images 310 with the derived metadata.

The combined expanded native metadata and the derived metadata can form the content metadata 330 for storage in the metadata database 130. By associating the captured photographic images 310 with the native and derived attributes of the content metadata 330, the data processing system 100 can aggregate the photographic images 310 captured by the content sources 200A-N at the selected venue 400A-N and, by tagging the photographic images 310 with the native metadata and the derived metadata, can store the otherwise unstructured aggregation of photographic images 310 in respective image (or content) wrappers as structured data for facilitating later access and distribution. Although shown and described with reference to FIG. 2B as comprising a camera 205 for capturing photographic images 310 for purposes of illustration only, the content source 200 can comprise any conventional type of content source for providing any type of digital content 300 to the content processing system 110.

The data processing system 100 advantageously can help enhance the experience of the attendees 420 at their events. By sending a unique set of photographic images 310 to each of the selected attendees 420, preferably in real time, the data processing system 100 can increase the depth of each attendees' experience with more relevance. The engagement furthermore can extend beyond the event by aggregating the experience over many attendees 420 and extending the experience beyond the moment.

Additionally and/or alternatively, the data processing system 100 can distribute the aggregated and tagged photographic images 310 and other content 300 to third parties other than the attendees 420. The data processing system 100 can use the derived metadata to identify photographic images 310 and other content 300 that may be relevant to a particular third party. If the derived metadata includes a name of a sponsor of the selected event, the data processing system 100 can identify the photographic images 310 and other content 300 associated with the selected event and provide the identified photographic images 310 and other content 300 to the sponsor. The sponsor can use one or more of the identified photographic images 310 and other content 300, for example, in promotional or other marketing materials. Similarly, if the selected event is a sporting event, the data processing system 100 can distribute the aggregated and tagged photographic images 310 and other content 300 to one or both sports teams.

Figure 3:
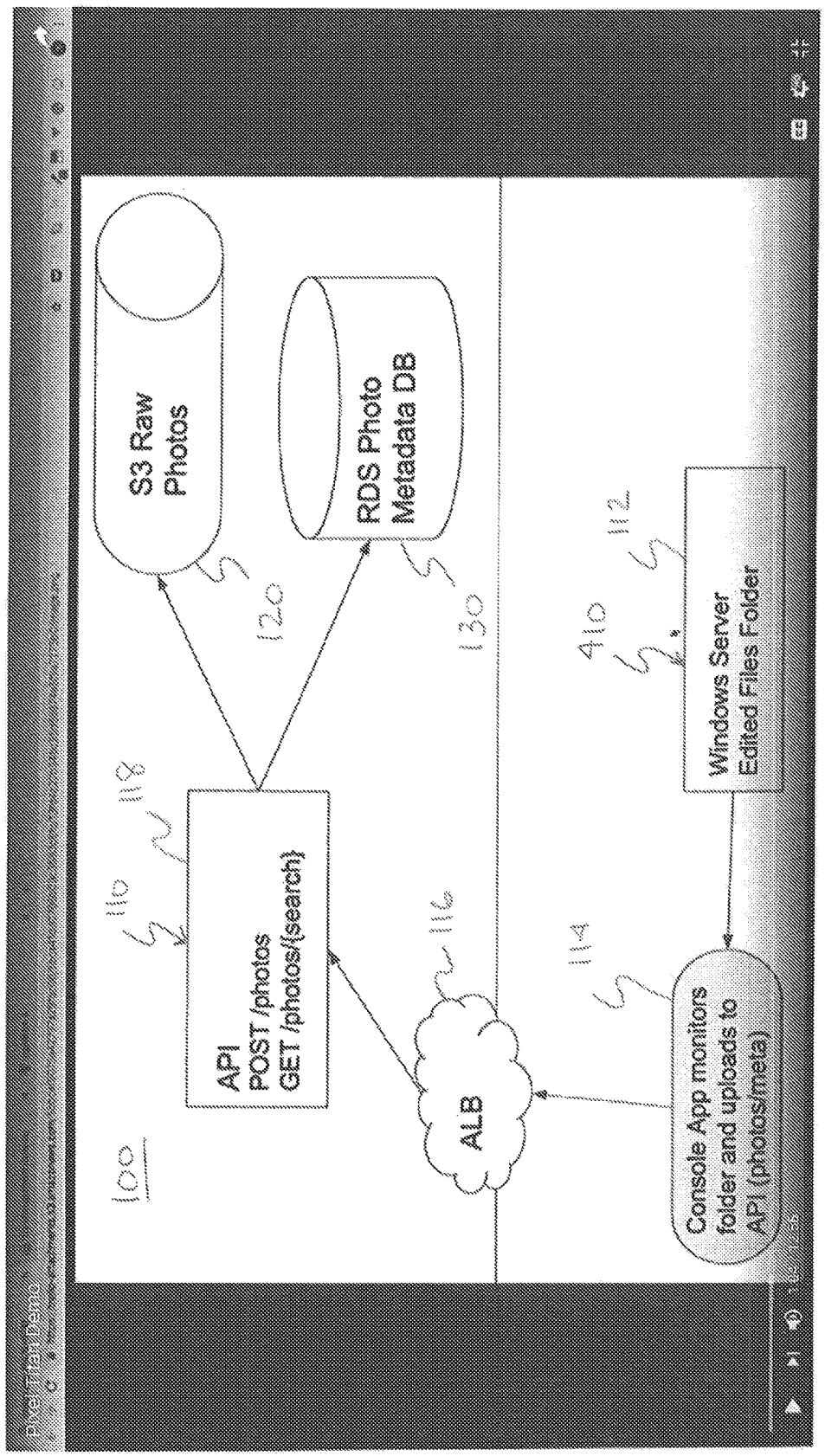
FIG. 3 is an exemplary top-level block diagram illustrating another alternative embodiment of the data processing system of FIG. 1, wherein the data processing system is implemented as an event-driven, serverless computing platform.
Figure 4:
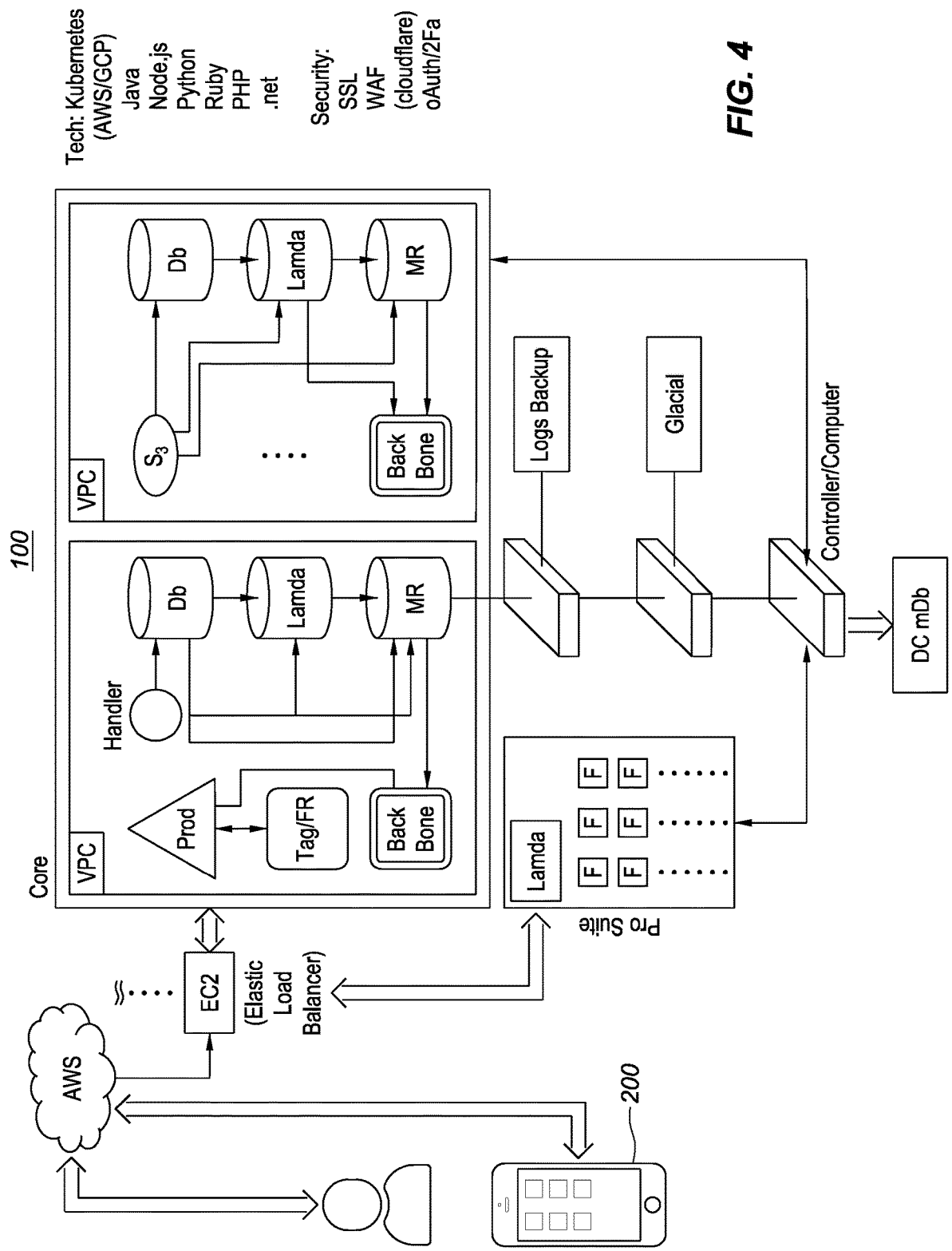
FIG. 4 is an exemplary detail drawing illustrating an alternative embodiment of the data processing system of FIG. 3.

In selected embodiments, the data processing system 100 can be implemented as an event-driven, serverless computing platform as shown in FIG. 3. An exemplary event-driven, serverless computing platform is the Amazon Web Services (AWS) Lambda provided by Amazon Web Services. As shown in FIG. 3, the content processing system 110 can include a Windows Server 112. The Windows Server 112 can operate as the kiosk 410 disposed at the selected venue 400 (shown in FIG. 2A) in the manner discussed in more detail above with reference to FIG. 2A and can include an edited files folder. The edited files folder can contain a set of the photographic images 310 (shown in FIG. 2A) to be stored in the raw content storage 120.

The content processing system 110 also can include console application (or listener) software 114 for monitoring the edited files folder on the Windows Server 112. The console application software 114, for example, can constantly monitor the edited files folder for addition of any new photographic images 310. Upon detecting the presence of a new photographic image 310 in the edited files folder, the console application software 114 can extract the (expanded) native metadata from the new photographic image 310. The console application software 114 can send the new photographic image 310 and the extracted native metadata to an application programming interface (API) 118 via application load balancer (ALB) 116.

The application load balancer 116 can be provided as an AWS Lambda function and can provide an endpoint for receiving the new photographic image 310 and the extracted native metadata from the console application software 114. In some embodiments, the application load balancer 116 and/or application programming interface 118 can parse the new photographic image 310 and the extracted native metadata, separating the raw photographic image from the extracted native metadata. The application load balancer 116 and/or application programming interface 118 can transmit the raw photographic image to the associated attendee 420 (shown in FIGS. 2A-B), provide the raw photographic image to the raw content storage 120 for storage and/or provide the metadata to the metadata database 130 for storage.

Figure 5B:
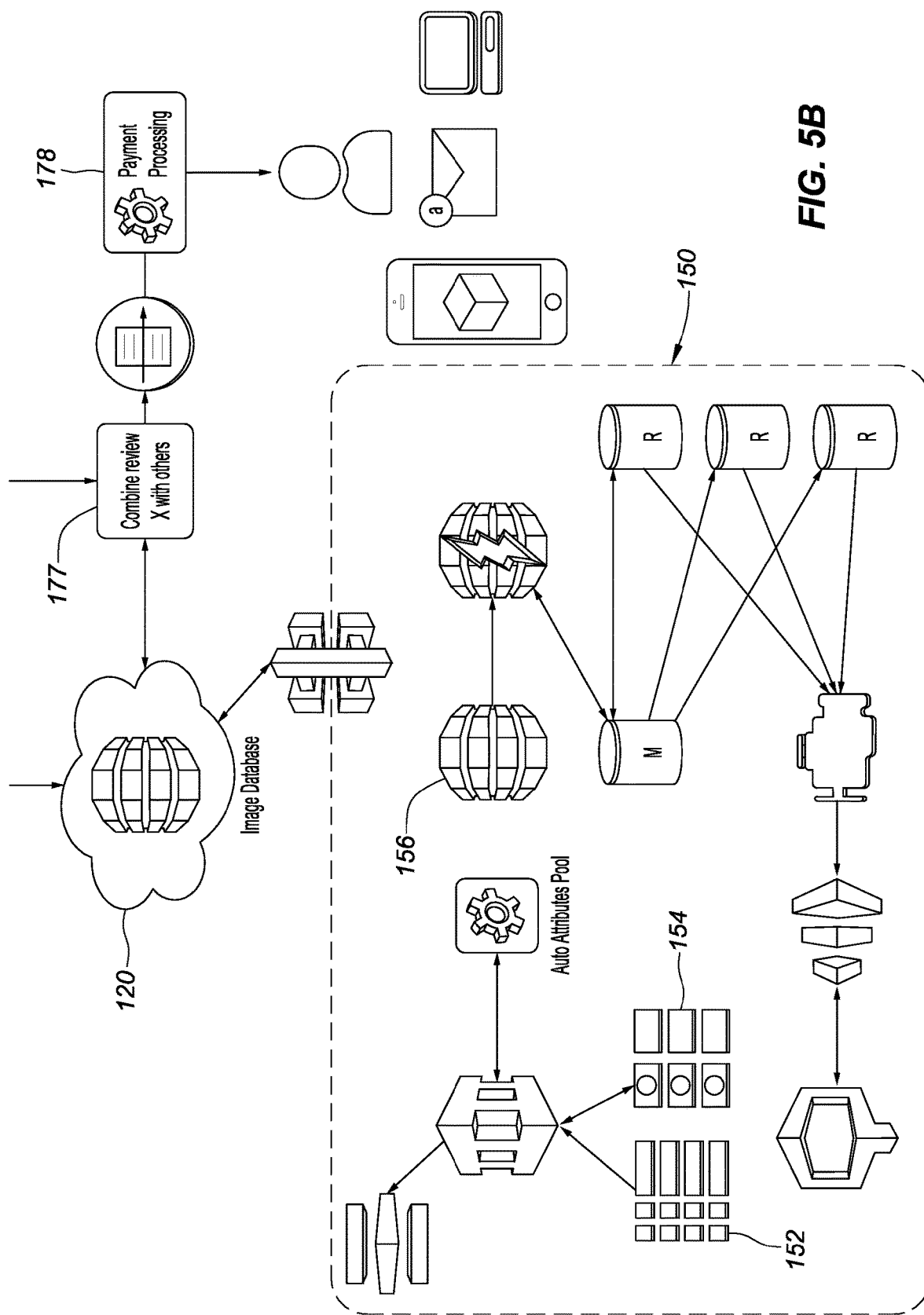

FIG. 5 illustrates another alternative embodiment of the data processing system 100. Turning to FIG. 5, the data processing system 100 is shown as including a user account lookup system 160. The account lookup system 160 can enable a user to access the data processing system 100 via an associated user hardware device (not shown), such as a user laptop computer and/or a user handheld device. Upon receiving user information from the user hardware device, the user account lookup system 160 can determine whether the client is a new user, at 162, or an existing user, at 164. The user account lookup system 160 then can create a new client account for the new user and/or recall an existing client account for the existing user and tag the relevant client account, at 166. An attributes assignment engine 168 can access user contact information, such as a user telephone number, and combine the user contact information with the other account information.

The user account lookup system 160 advantageously can enable the user to order one or more photographic images 310 or other content 330 (collectively shown in FIG. 2A) stored in the data processing system 100 for delivery to the user hardware device, at 170. Upon receiving the user order, the data processing system 100 can determine whether the ordered content 330 should be edited, at 172, or should not be edited, at 174, prior to delivery to the user. The application programming interface 118 advantageously can include one or more Lambdas that support creating content 300, editing of the content 300 and/or storing content 300. In preferred embodiments, the Lambdas can support simultaneous creation, editing and/or storing of the content 300. The ordered content 330 and user order results can be reviewed, at 176, and the user order can be finalized for delivery to the user, at 177. In some embodiments, the data processing system 100 can process user payments for the ordered content 330, at 178.

As shown in FIG. 5, a selected AWS instance 150 can provide a static information database 152 for storing information, such as a schedule of events for one of more selected clients, that are not expected to change over time. Additionally and/or alternatively, the selected AWS instance 150 can provide a derived information database 154. The derived information database 154 can store information, such as the derived attributes (or metadata), that can be applied to the content 300 based upon the native attributes (or metadata) in the manner discussed in more detail herein. In some embodiments, the selected AWS instance 150 can include metadata database 156. The metadata database 156 can store structured and/or unstructured content 300 and other data received by the data processing system 100.

Figure 6:
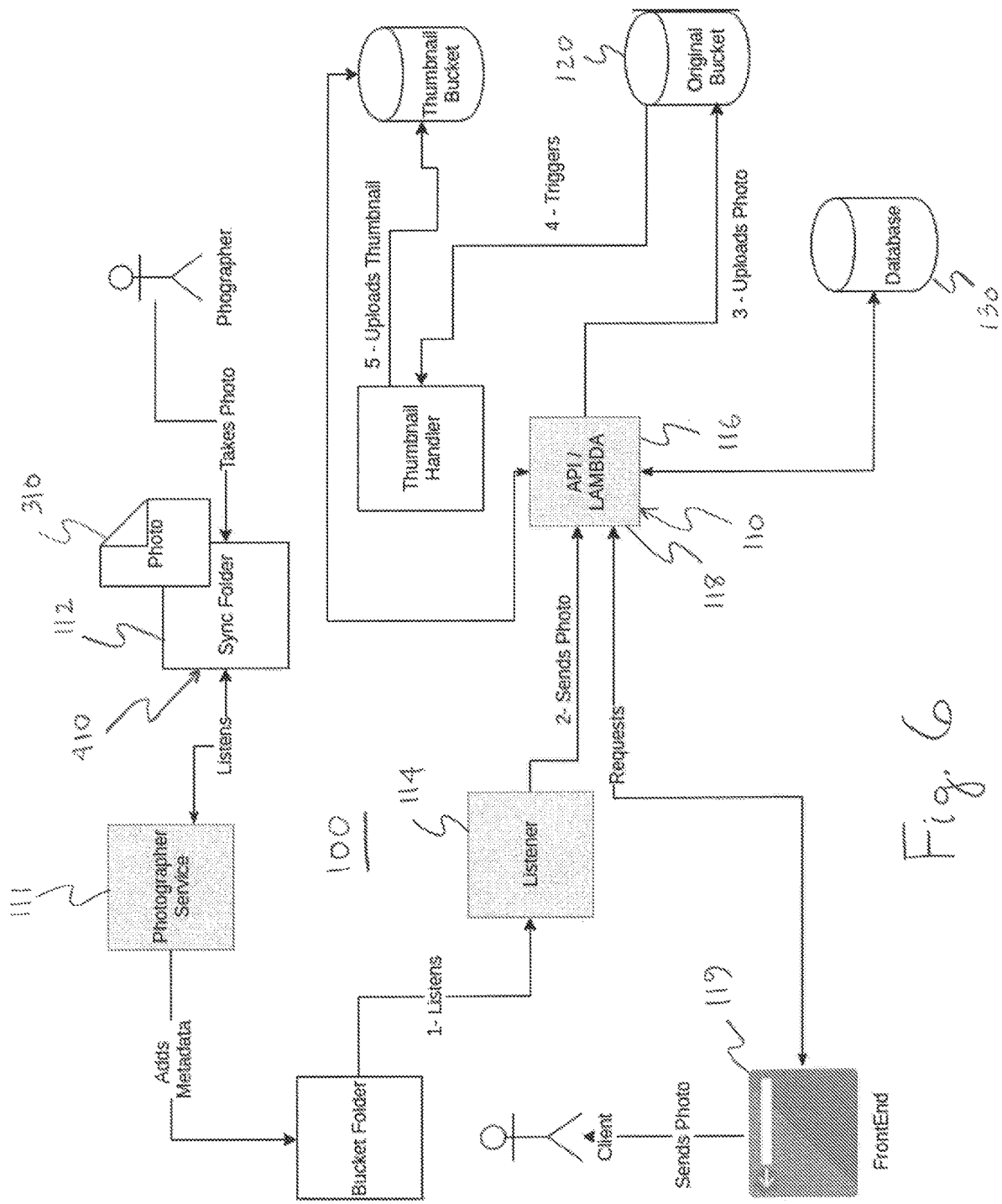
FIG. 6 is an exemplary top-level block diagram illustrating an embodiment of a workflow for the data processing system of FIG. 1.

An exemplary workflow for the data processing system 100 is shown in FIG. 6. The workflow of FIG. 6 illustrates the operation of the data processing system 100 from capture and upload of the photographic images 310 to the kiosk 410 (or the Windows Server 112) disposed at the selected venue 400 (shown in FIG. 2A) to storage and distribution of the captured photographic images 310. Upon detecting the presence of a new photographic image 310 in the edited files folder of the kiosk 410, a photographer service system 111 can receive the new photographic image 310. The photographer service system 111 can comprise a local website running on localhost and can provide photographers with access. The photographer service system 111 can enable the photographer to edit the metadata of the new photographic image 310. The new photographic image 310 and edited metadata can be provided to a listener folder of the console application software 114.

In selected embodiments, the photographer service system 111 can be run by using Git and/or Node js. Instruction to download the software for the photographer service system 111 can be accessed at git clone https://gitlab.com/pixeltitan/photographer-service.git; and/or cd photographer-service. Activation of the photographer service system 111 can be initiated via npm install and/or npm start with an open browser on port 4000. The environment for the photographer service system 111 can set up via an .env file with the following commands:

LISTEN_PATH=/home/pixeltitan/photos
WRITE_PATH=/home/pixeltitan/photographer-service/images
BUCKET_PATH=/home/pixeltitan/sync-listener.

The listen path is where the photographer service system 111 can receive the photographic images 310 from the photographer. The write path is the photographic images folder inside the photographer service system 111; whereas, the bucket path is where the edited new photographic image 310 and edited metadata can be moved once the metadata is added. The bucket path preferably comprises the same path as the listener listen path.

Figure 7A:
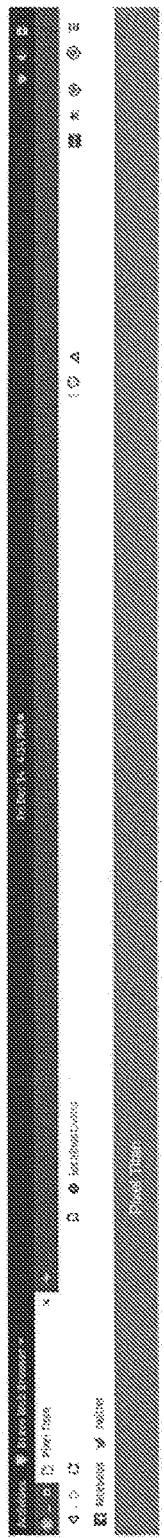
FIG. 7A is an exemplary screenshot illustrating an embodiment of a photographic image screen of a photographer service system of the data processing system of FIG. 6, wherein the photographic image screen shows new and recently-captured photographic images.
Figure 7A:
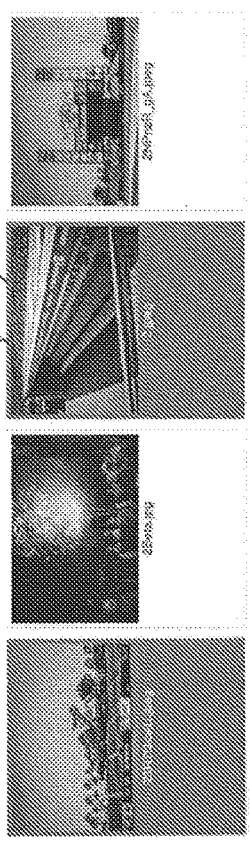
Figure 7A:
Figure 7B:
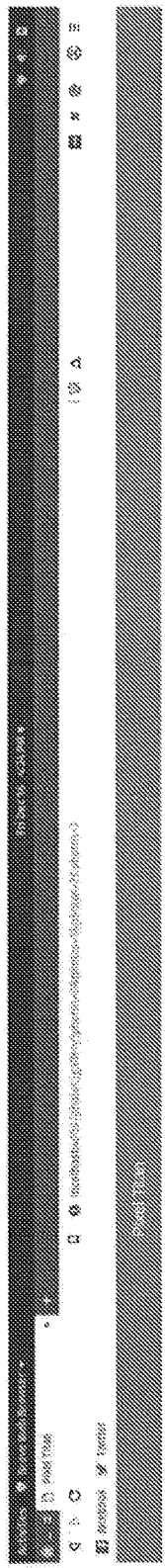
FIG. 7B is an exemplary screenshot illustrating an embodiment of a metadata editing screen of the photographer service system of FIG. 7A, wherein the metadata editing screen permits editing of metadata associated with a selected photographic image.
Figure 7B:
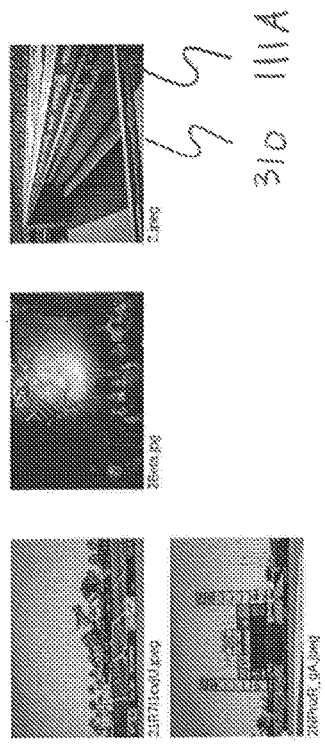

FIG. 7A is an exemplary photographic image screen 111A of the photographer service system 111, wherein the photographic image screen 111A shows the new photographic image 310 and one or more recently-captured photographic images. The photographic image screen 111A also includes a link 111B to a metadata editing screen 111C of the photographer service system 111. An exemplary embodiment of the metadata editing screen 111C of the photographer service system 111 is shown in FIG. 7B. The metadata editing screen 111C can permit the photographer to add a telephone number of an attendee 420 (shown in FIG. 2A) or otherwise edit the metadata associated with the new photographic image 310.

In the manner discussed above, the console application (or listener) software 114 can monitor the edited files folder and can receive the new photographic image 310 and edited metadata. The console application software 114 also can send a request to the application load balancer 116 and/or application programming interface 118 to upload the new photographic image 310 and a request to the metadata database 130 to upload the edited metadata In selected embodiments, the console application software 114 can be run by using Git and/or Node js. Instruction to download the console application software 114 can be accessed at git clone https://gitlab.com/pixeltitan/listener.git; and/or cd listener. Activation of the console application software 114 can be initiated via npm install and/or npm start. The environment for the console application software 114 can set up via an .env file with the following commands:

LISTEN_PATH=—/images
LOCATION=something
OPPONENT=something
LAMBDA_URL=https://XXXXXXXX.execute-api.us-east-1.amazonaws.com/dev/photo/large.

The listen path is where the console application software 114 listens for new photographic images 310. The console application software 114 thereby can receive the new photographic image 310 and edited metadata for subsequent transmission to a frontend system 119 of the data processing system 100. Preferably, the console application software 114 provides only photographic images 310 that are associated with metadata to the frontend system 119.

The data processing system 100 is further shown in FIG. 6 as including a frontend system 119. In selected embodiments, the frontend system 119 can allow a system administrator of the data processing system 100 and/or the kiosk 410 to search for stored photographic images 310 and other content 300 organized by attendee phone number. The frontend system 119 can allows the system administrator to resize the stored photographic images 310 and/or to deliver the stored photographic images 310 to an attendee or other person or organization.

Figure 8A:
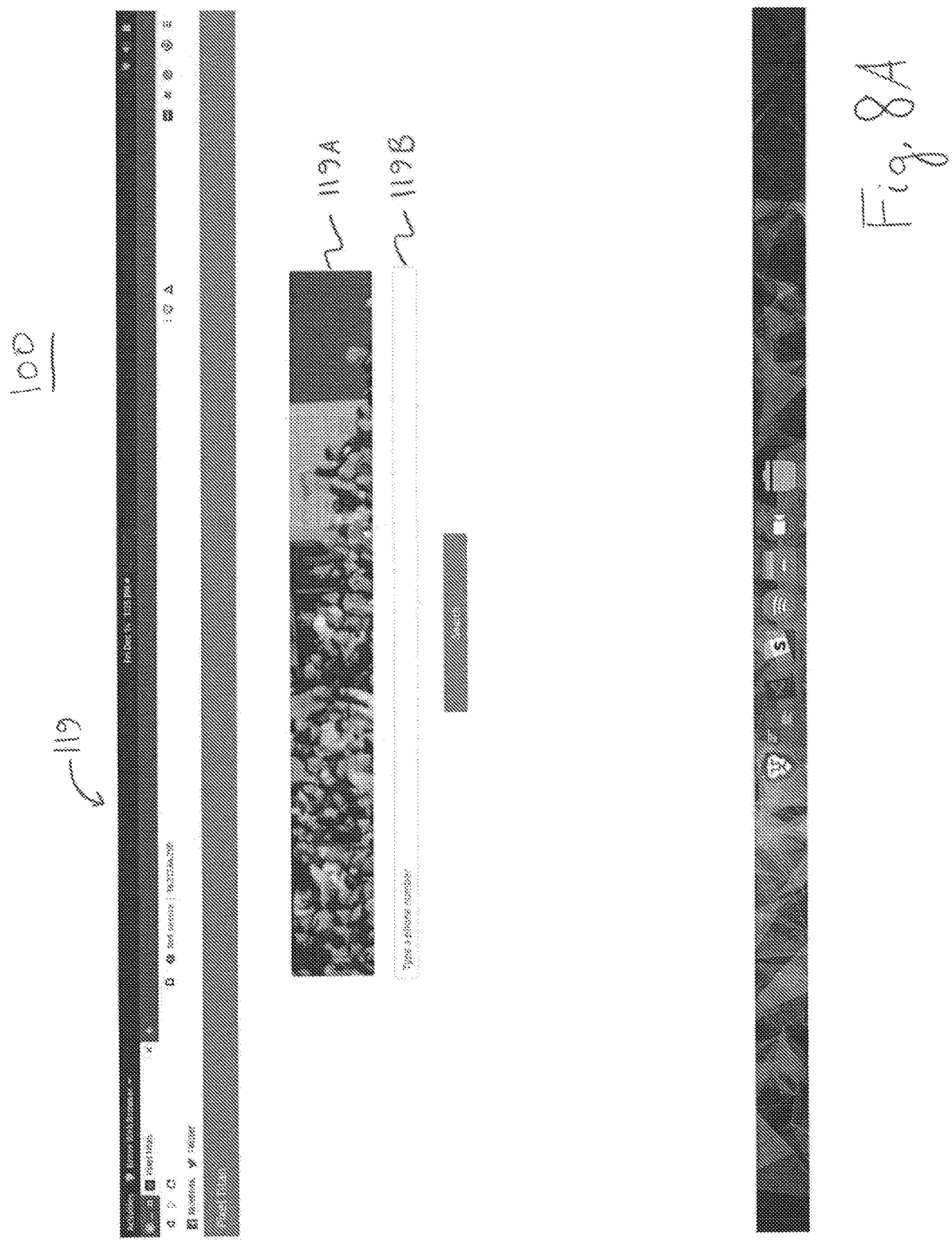
FIG. 8A is an exemplary screenshot illustrating an embodiment of a telephone number entry screen of a frontend system of the data processing system of FIG. 6, wherein the telephone number entry screen enables a system administrator to access content stored in the data processing system.
Figure 8B:
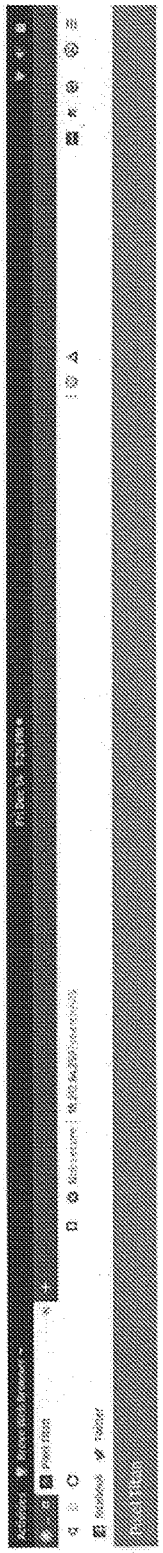
FIG. 8B is an exemplary screenshot illustrating an embodiment of a telephone number listing screen of the frontend system of FIG. 8A, wherein the telephone number listing screen presents a list of telephone numbers associated with content stored in the data processing system.
Figure 8B:
Figure 8C:
FIG. 8C is an exemplary screenshot illustrating an embodiment of a photographic image listing screen of the frontend system of FIG. 8A, wherein the photographic image listing screen presents a group of stored photographic images associated with a selected attendee telephone number.

In selected embodiments, the frontend system 119 can be run by using Git and/or Node js. Instruction to download the frontend system 119 can be accessed at git clone https://gitlab.com/pixeltitan/frontend.git; and/or cd frontend. Activation of the frontend system 119 can be initiated via npm install and/or npm start with a deploy build folder on a static server. The environment for the frontend system 119 can set up via an configuration file that points to the right values:

/**src/config.js**/export
default {
LAMBDA_URL: "https://XXXXXXXX.execute-api.us-east-1.amazonaws.com/dev",
TEST_URL: "http://127.0.0.1:3000" };

FIG. 8A is an exemplary telephone number entry screen 119A of the frontend system 119. The telephone number entry screen 119A includes a field 119B for enabling the system administrator to access content 300, such as photographic images 310, stored in the data processing system 100. An exemplary telephone number listing screen of the frontend system 119 is shown in FIG. 8B, wherein the telephone number listing screen presents a list 119C of telephone numbers associated with the content 300 stored in the data processing system 100. In FIG. 8C, an exemplary photographic image listing screen of the frontend system 119 is shown. The photographic image listing screen can present a group 119D of stored photographic images 310 associated with a telephone number selected by the system administrator via the telephone number listing screen.

Figure 8D:
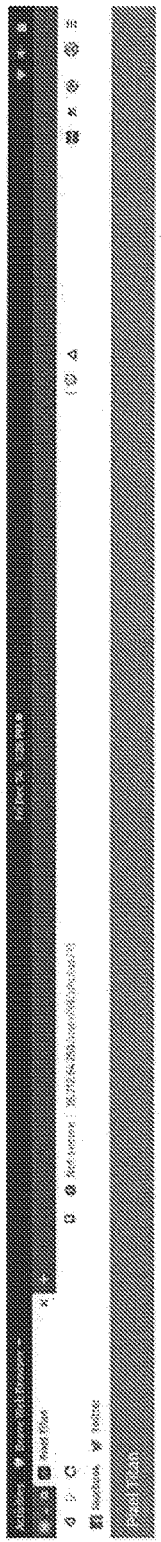
FIG. 8D is an exemplary screenshot illustrating an embodiment of a photographic image detail screen of the frontend system of FIG. 8A, wherein the photographic image detail screen presents detailed information about a selected stored photographic image associated with the attendee telephone number.
Figure 8D:
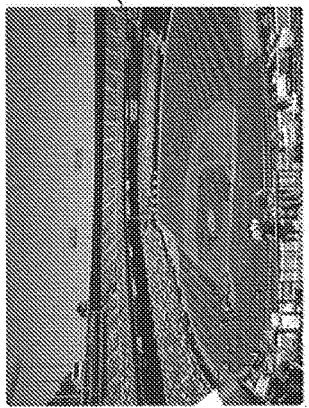
Figure 8D:

An exemplary photographic image detail screen of the frontend system 119 is illustrated in FIG. 8D. In FIG. 8D, the photographic image detail screen can present detail information 119E about a stored photographic image 310 selected by the system administrator via the photographic image listing screen. The detail information can include a file name and/or a file size of the selected photographic image 310 and/or can include one or more links 119F for enabling the system administrator to edit, resize and/or download the photographic image 310.

The application programming interface 118 can manage communication among the console application (or listener) software 114, the application programming interface 118 and the metadata database 130. For example, the application programming interface 118 can be responsible for resizing photographic images 310, delivering the selected photographic images 310 to an attendee or other person or organization, adding new metadata and other data to the metadata database 130, and/or retrieving stored metadata and other data from the metadata database 130. In selected embodiments, the application programming interface 118 can be run by using Git and/or Node js. Instruction to download the application programming interface 118 can be accessed at git clone https://gitlab.com/pixeltitan/api.git; and/or cd api. Activation of the application programming interface 118 can be initiated via npm install and/or npm run debug.

The AWS Lambda advantageously can be set up with continuous integration in Gitlab. Continuous integration can avoid manual deployments, and any code that fails to compile is not provided to the server, resulting in the AWS Lambda being less prone to bugs and unexpected errors. Since the Lambdas can be hosted by Amazon Web Services includes continuous integration in Gitlab, individual systems do not require separate environment setups to make use of the Lambdas. In selected embodiments, the data processing system 100 can be upgradable to add and/or modify system functionality and/or to add more Lambdas.

Several Lambdas can be available for the data processing system 100. For example, the uploadImage Lambda can receive a photographic image 310, read the metadata embedded in the received photographic image 310, store the raw photographic image data for the received photographic image 310 as the raw content 320 in the raw content storage 120, create a record of the received photographic image 310 in the metadata database 130, and/or associate the received photographic image 310 with an attendee or other person or organization. Additionally and/or alternatively, the uploadImage Lambda can create a new user account if the embedded metadata identifies an attendee or other user without an existing user account.

Other exemplary Lambdas can include the thumbnailGenerator Lambda can listen for new photographic images 310 added to the raw content storage 120 and can create a thumbnail image for each new photographic image 310. The listPhotosByUser Lambda can generate a list of photographic images 310 associated with a selected attendee or other user and/or a specific photographic image 310 associated with a selected attendee or other user. The shareLink Lambda can provide a short message service (SMS) message to a phone number of a selected attendee or other user. The short message service message can include one or more links to the frontend system 119 from which the selected attendee or other user can view associated photographic images 310 available via the data processing system 100.

Additionally and/or alternative, the editPhoto Lambda can enable a selected attendee or other user to edit photographic images 310 available via the data processing system 100. The editPhoto Lambda, for example, can resize the photographic images 310 to have a user-entered image width and is able to automatically calculate the new image height for the photographic images 310 based upon the user-entered image width. The getPhoto Lambda can retrieve one or more photographic images 310 from the data processing system 100. The uploadLargeImage Lambda can upload photographic images 310 with a file size above 6 MB to the data processing system 100.

In selected embodiments, the data processing system 100 can support PRD data processing. The data processing system 100 thereby can automatically create metadata for the content 300 during transmission to the raw content storage 120 and the metadata database 130 for storage. Additionally and/or alternatively, the data processing system 100 can flatten storage of the digital content 300 by recording receipt of the digital content 300 without storing the actual raw content 320. The data processing system 100, for example, can store the raw content 320 separately from the content metadata 330.

The data processing system 100 can include an optional Insights Engine (not shown) that can comprise a relational data engine capable of pivoting the stored digital content 300 over one or more data points and correlating disparate points within the data set. An optional predictive analytics platform can provide statistical modeling of likely behaviors based on known demographic data.

It will be appreciated that the data processing system 100 can be platform agnostic and can be configured to process any conventional industry type of digital content 300, including digital audio files, digital video files and/or data files, without limitation. The data processing system 100 optionally can provide an authoritative chain of custody for the content 300 during transmission from the content source 200 to the selected attendees 420, local storage system, the raw content storage 120 and/or the metadata database 130, safeguarding the content 300 to the highest levels available (collectively shown in FIGS. 2A-B). In some embodiments, the data processing system 100 can limit transmission of the content 300 to lowest possible threshold to complete the task.

Figure 9B:
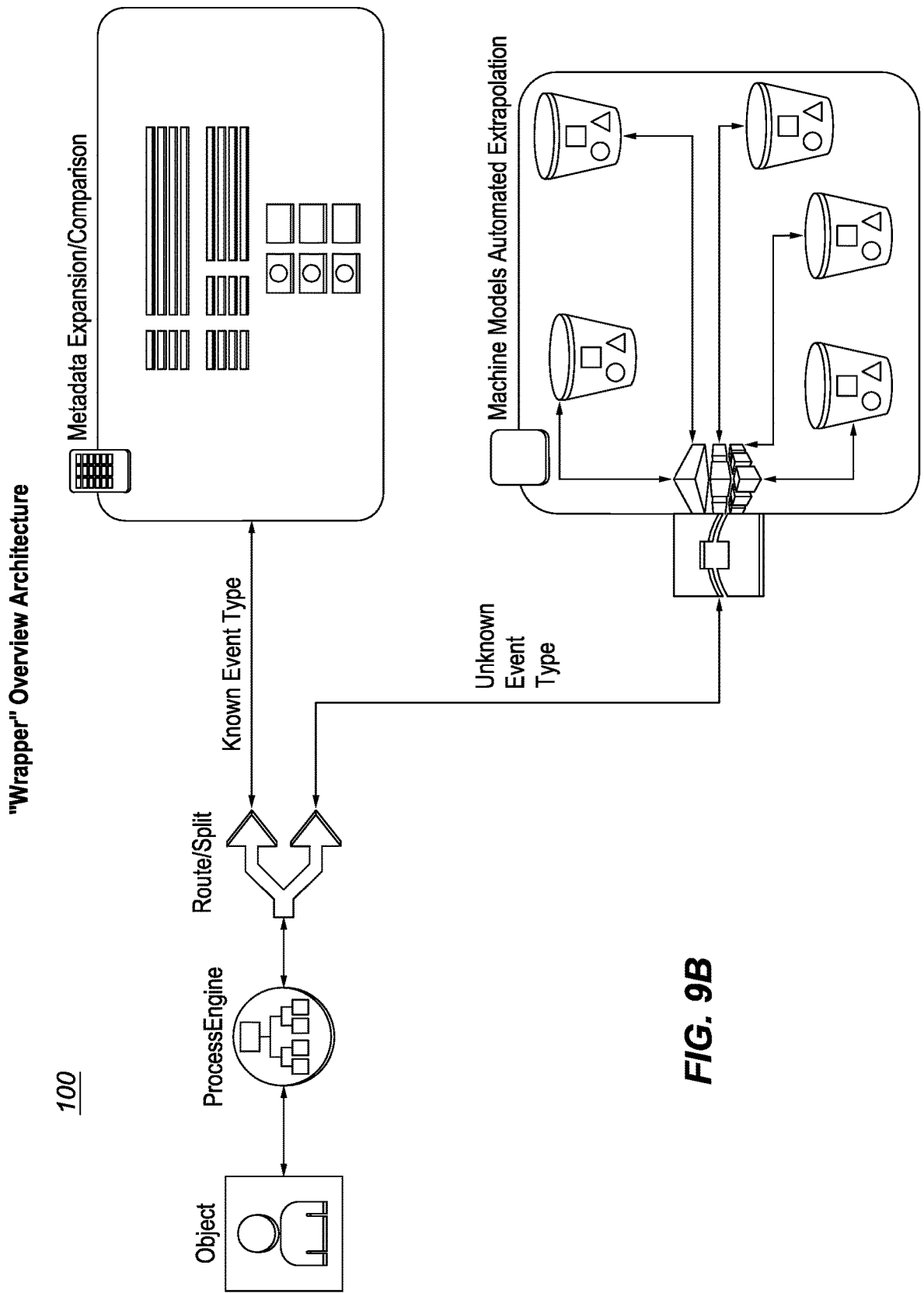
FIG. 9B is an exemplary top-level block diagram illustrating a system for generating a content wrapper for the content received by the data processing system of FIG. 3.

In the manner set forth herein, the data processing system 100 can store the otherwise unstructured content 300 in one or more content wrappers as structured data for facilitating later access and/or distribution. With reference to FIGS. 9A-B, the content wrappers can function as an aggregation packet for containing both the metadata in the classic sense (as descriptors) and also key data outside of metadata within an immutable field (creation, location, authorship, etc.) on a blockchain. As such, any data created can be transmuted into the data processing system 100 at time of creation, or post-creation, and ingested by the data processing system 100.

Further, the application programming interface (API) 118 (shown in FIG. 3) can be extended to a client level endpoint. The data processing system 100 thereby can execute a push/pull request to extend data at the client level based upon Cloud System modeling. Functionally, this would mean deploying MLM against unknown file types to determine content, descriptors, and usage rules that are written closely after creation and locked into place as the content wrapper. The object, wrapper data (in aggregate or in sub-descriptors), and their relationships can become discrete pieces of information to process. In this way the following API Schema for the application programming interface 118 can initially be set as:

$.location
$.time_date
$.metadata_*
$.author
$.searchable
$.protected
$.mutable, wherein the wildcard above denotes: formal field name; underlying type; or relational/non-relational.

In selected embodiments, the data processing system 100 can perform the following core functions: ingestion; interpretation; and/or delivery. The data processing system 100 therefore can take into account API requirements for minimum viable key to accomplish interpretation of the received content 300 with high accuracy and low latency. Two points of data are typical to achieve minimum viability, but, in certain situations, such as medical situations, three or more points of data can be utilized to achieve minimum viability. In view of the above API requirements, the data processing system 100 does not need to store the raw content 320; however, the raw content 320 can be stored, as needed, for examine, for premium clients and/or in use cases which may require storage of the raw content 320. The data processing system 100 can be passed on Simple Object Access Protocol (SOAP) API standards to allow for enhanced security zone availability in communicating with the local client listener.

Figure 10A:
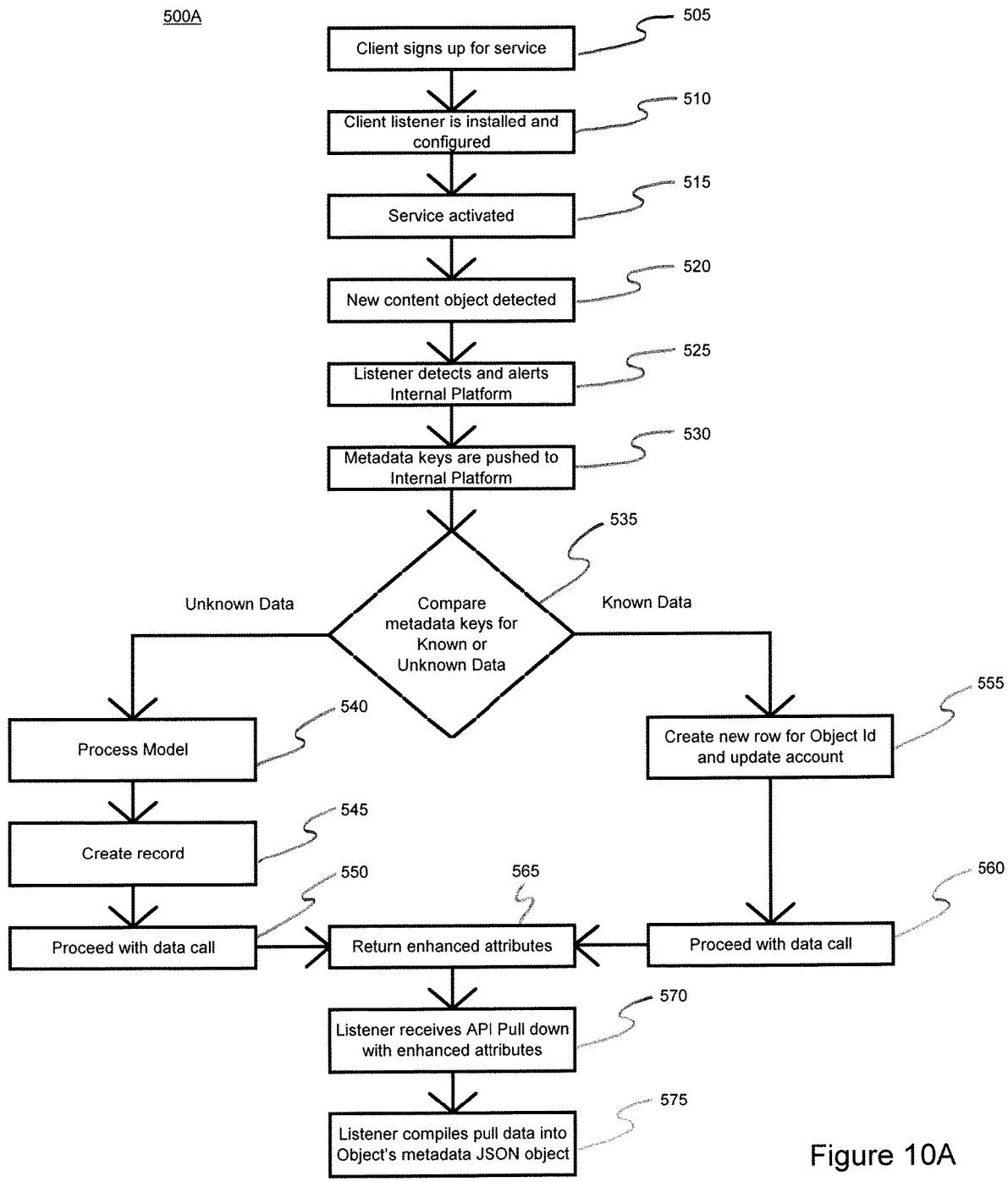
FIG. 10A is an exemplary top-level flow chart illustrating an embodiment of a standard client flow for the data processing system of FIG. 3.

Turning to FIG. 10A, an exemplary standard client flow 500A is shown for the data processing system 100. The standard client flow 500A does not provide for storage of any raw content 320. The standard client flow 500A includes, at 505, a client can sign up for service via the data processing system 100. At 510, the console application (or listener) software 114 can be installed and configured on each user machine covered by the service. The service can be activated, at 515.

Activation of the service can include performance and completion of quality assurance and other testing. New content 300 can be created, at 520. The console application (or listener) software 114 can detect the new content 300, at 525, and can alert the data processing system 100 about the new content 300 via an API call. A blockchain can be created to include an author, time and device information in parallel with the API call. At 530, metadata keys can be pushed to the data processing system 100.

A decider engine of the data processing system 100 can compare the metadata keys for known (or pre-uploaded) content 300 or unknown content 300, at 535. If the new content 300 is unknown, a model will be needed. The AWS database can first process the model, at 540, and then, upon completion of the cycle, can create a record for the unknown content 300, at 545. The unknown data call proceeds, at 550, and the data processing system 100 can return enhanced attributes (or metadata), at 565, based upon the resultant data.

Alternatively, if the new content 300 is known, the AWS database can create a new row for an object identifier for the new content 300, at 555. The object identifier can include, for example, a file name, a file type and/or any other object identifier information. The client account then can be updated. The known data call proceeds, at 560, and the data processing system 100 can return enhanced attributes (or metadata), at 565, based upon the resultant data.

Once the enhanced attributes are returned, at 565, the console application (or listener) software 114 can receive an API pull down from the data processing system 100 with the enhanced attributes, at 570. The blockchain also can be updated with the transaction and given a key to the attribute wrapper identifier. At 575, the console application (or listener) software 114 can compile pull data into the metadata JavaScript Object Notation (JSON) object of the new content 300. The AWS database optionally can be updated with the transaction down time stamp, ending the standard client flow 500A. As desired, the standard client flow 500A can repeat by returning to a preceding step, such as signing up a new client, at 505, or detection of a new content object, at 520.

Figure 10B:
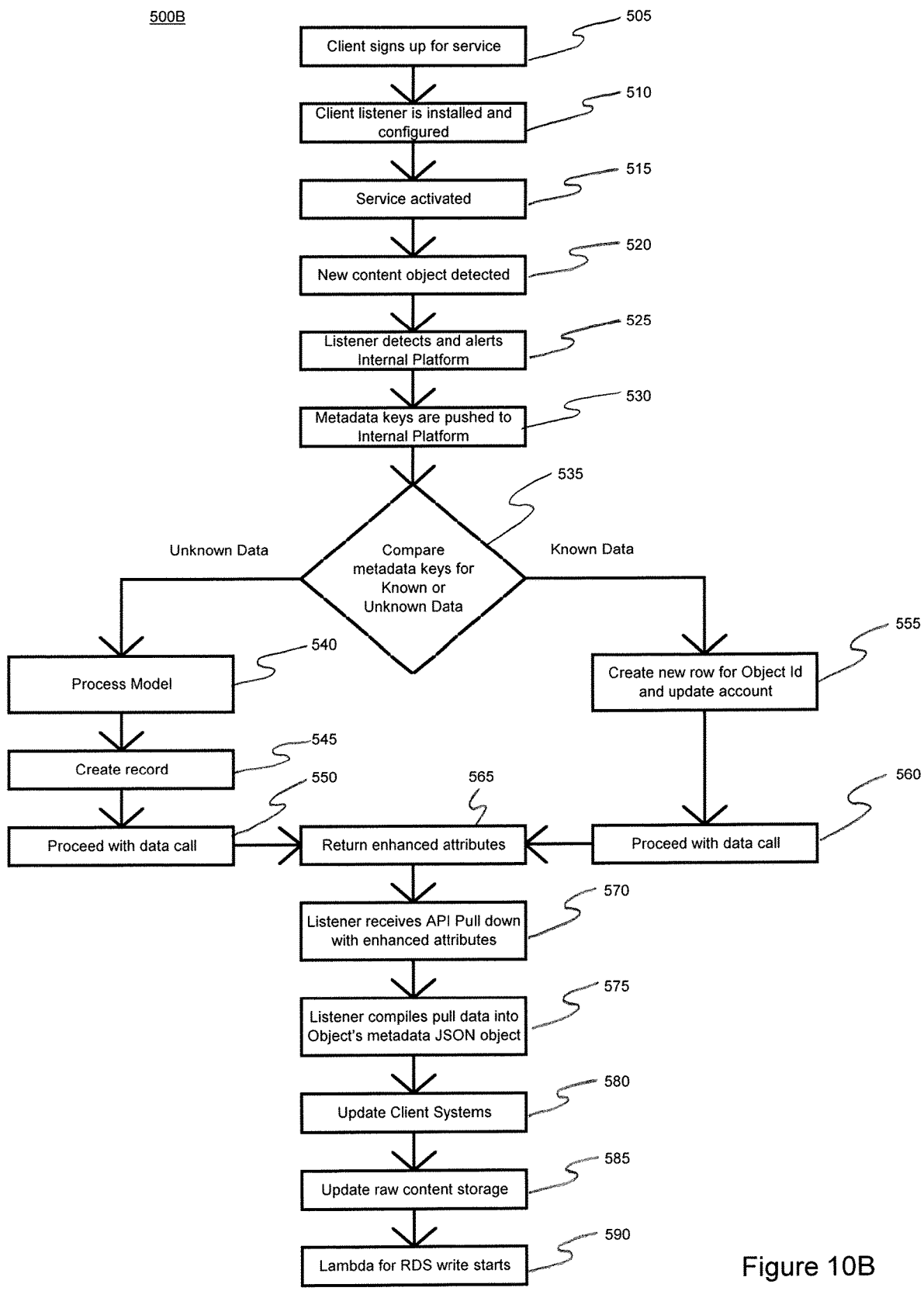
FIG. 10B is an exemplary top-level flow chart illustrating an embodiment of an enhanced client flow for the data processing system of FIG. 3, wherein the enhanced client flow includes storage of the raw content.

An exemplary enhanced client flow 500B is shown in FIG. 10B. The enhanced client flow 500B includes storage of raw content 320. Mirroring the standard client flow 500A shown in FIG. 10A through compiling the pull data into the metadata JSON object of the new content 300, at 575, the enhanced client flow 500B further includes updating the client systems, at 580. The client systems update can include storing the raw content 320 associated with the new content 300 in a permanent location, such as the raw content storage 120, rather than in a temporary, transactional location.

In saving the raw content 320, a second API call can be made to a standard backend system of the data processing system 100 to ingest the raw content 320 for storage. The update to the raw content storage 120 can be completed, at 585, and a Lambda for RDS write can start per standard flow, and new location data for the raw content storage 120 can be updated for the object identifier, at 590. As desired, the enhanced client flow 500B can repeat by returning to a preceding step, such as signing up a new client, at 505, or detection of a new content object, at 520.

It will be appreciated that, upon starting service details of type of data agreement will be shared with engineering resources and the onboarding phase will commence. During this time internal engineering will partner with appropriate client teams and address practical needs in infrastructure, security concerns, configuration of expected data values, types of modeling potentially needed, and all other concerns to satisfy Service Level Agreement (SLA). Once all aspects of engagement are detailed client level software will be installed, and AWS backend will be configured to begin services. As "objects" are created on the client level system, the data processing system 100 can ingest as appropriate the data specified per SLA and process as required. The blockchain transactions can be kept as an objective record both providing value to the client to ascertain ownership and to satisfy service requirements of the data processing system 100.

For objects of the known data type upon receipt, the data processing system 100 can compare to the pre-existing data sets, query for the "key fields" disclosed by the client, and return the predetermined enhanced data fields. An example of this functionality would be taking the date field from a photograph for the Giants. With two "key fields" being Date and Client in this case, the data processing system 100 can return the fields for Opponent, Special Event, and/or any other fields the Giants provide to pre-load into the database of the data processing system 100. As the data processing system 100 returns data, the data processing system 100 can pull from the client side the prepared data, and write the new data to both the Blockchain ledger as a transaction, and also concatenate new fields to the object record at the client's discretion onsite. There may be cases to which the client does not want the enhanced data written on their side for regulatory/compliance reasons, or for other factors that the data processing system 100 will need to take into account in the configuration of the client listener software. In such cases as the data is "ephemeral" and not recorded permanently within the client-side data architecture, the data processing system 100 can pay special attention to data logging and Blockchain handshake method to ensure the data is captured on both sides in a recoverable and reconcilable method.

For objects of the unknown data type, the data processing system 100 can face a couple of unique challenges. Firstly, until a class is developed enough within the MLMs, the data processing system 100 may not have a high degree of certainty with regards to returning appropriate system generated "Wrapper Attributes" automatically. In such cases, the data processing system 100 can use exemplar data from the client that is sufficient to begin developing enough of a model to satisfy the SLA standards. Each client engaging in an unknown data type of agreement will require the creation of a new Learning Model in order to process their data as well. Upon creation of the model and the determination it has cycled through enough data to return a client agreed upon reasonable belief that the returned results are trustworthy for their purposes, the data processing system 100 can proceed to the phase as with Known data class objects for processing and returning data. Once this step of "normalizing" responses to Unknown data type requests is completed all other data handling and processing steps will take place in the same progression and cadence as with a Known data type.

It will be further appreciated that the wrapper feature of the data processing 100 can be readily extended to many industries such as: medical imaging (classification, analysis, research, etc.); live performance; sporting events; corporate events; automotive (Original Equipment Manufacturer (or OEM), consumer, third party); financial markets; industrial markets; government and/or construction. Each industry may require its own separate PRD to fully detail required efforts, and estimate timelines for development.

As used herein, a phrase in the form of at least one of A, B, C and D herein is to be construed as meaning one or more of A, one or more of B, one or more of C and/or one or more of D.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for aggregating and distributing new unstructured data content including raw content and content metadata at a console system from a content source, comprising:

receiving an alert about the new data content via an application programming interface (API) call;

comparing the content metadata with metadata keys for known content associated with at least one client account;

creating a new object identifier in a selected client account for the new data content in which the content metadata matches a selected metadata key for known content associated with the selected client account;

creating a new client account, processing a new model for the new data content in which the content metadata does not match the metadata keys for the known content; and returning enhanced metadata for the new data content, wherein the console system receives the new data content from the content source, receives API pull down data with the enhanced attributes from the processing system, compiles the API pull down data and combines the enhanced metadata with the content metadata to form composite content metadata, and wherein the composite content metadata includes context information for organizing the new data content as structured data in real time.

* * * * *